US005896910A

United States Patent [19]
Chen

[11] Patent Number: 5,896,910
[45] Date of Patent: Apr. 27, 1999

[54] AUTOMOBILE REAR WINDSHIELD SUNSHADE DEVICE

[75] Inventor: Hsien-Pao Chen, Tainan, Taiwan

[73] Assignee: Pi-Hsiu Wang, Tainan Hsien, Taiwan

[21] Appl. No.: 08/640,182

[22] Filed: Apr. 30, 1996

[51] Int. Cl.$^6$ .................................................. B60J 1/20
[52] U.S. Cl. .................. 160/370.22; 160/24; 160/66; 160/310
[58] Field of Search .................. 160/370.22, 23.1, 160/24, 66, 67, 70, 79, 310, 311; 296/97.7, 97.8, 97.4

Primary Examiner—David M. Purol
Attorney, Agent, or Firm—Bacon & Thomas

[57] ABSTRACT

An automobile rear windshield sunshade device includes a base, a moving unit having a case pivotally supported by the base, a motor and two gears engaging with each other and rotated by the motor. Two driving arms to are moved up and down by the two gears, to extend and retract a sunshade unit having a winding roller for winding a sunshade curtain. The upper end of the curtain is connected with a strip fixed with an elongated bar, which is raised up and down by the two driving arms. The case and the driving arms can be adjusted in their angle relative to the base to adapt to the angle of the rear windshield.

4 Claims, 9 Drawing Sheets

AUTOMOBILE REAR WINDSHIELD SUNSHADE DEVICE

BACKGROUND OF THE INVENTION

This invention concerns an automobile rear windshield sunshade device controlled by a switch on a gauge panel to raise and lower a sunshade curtain and which is adaptable to various inclined angles of rear windshields.

Figure 1:
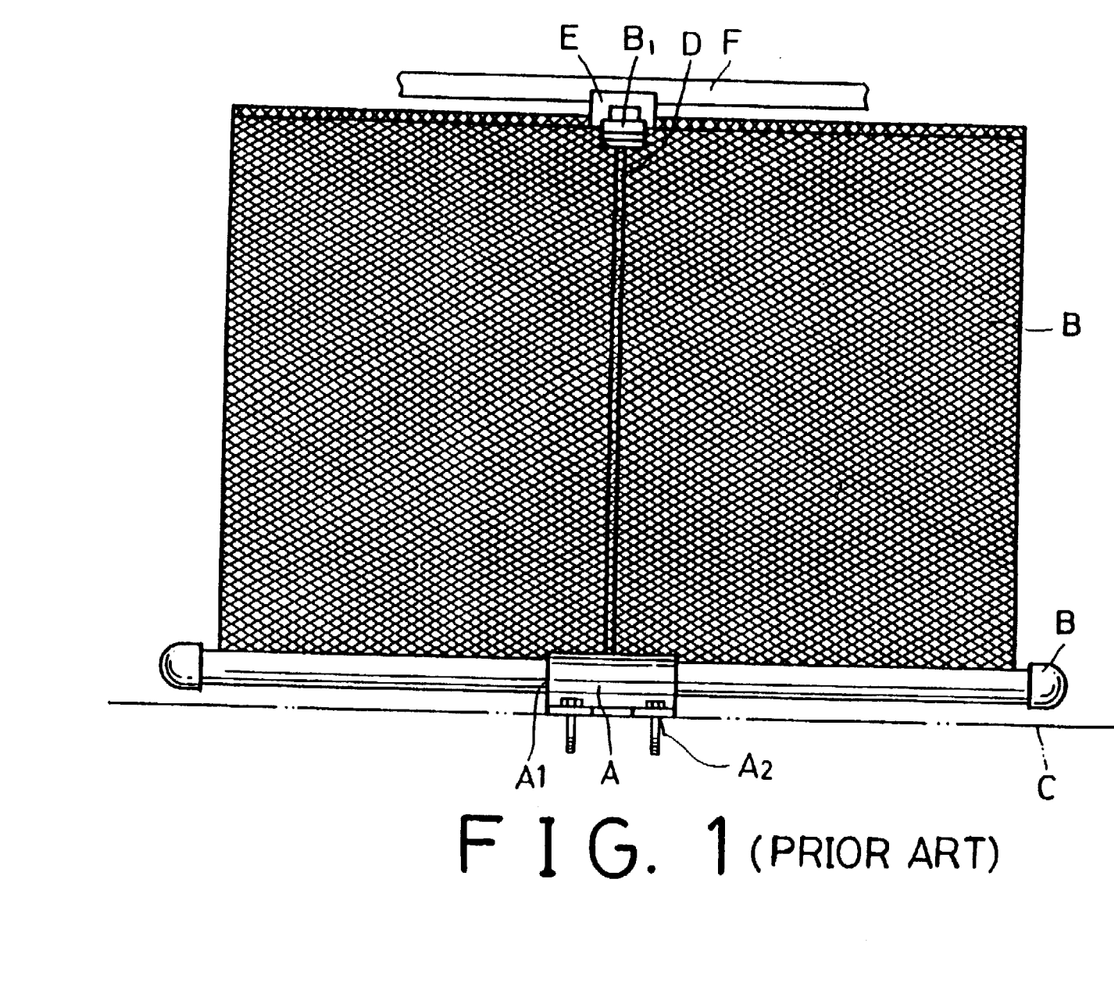
FIG. 1 is a front view of a known conventional automobile rear windshield sunshade device.
Figure 2:
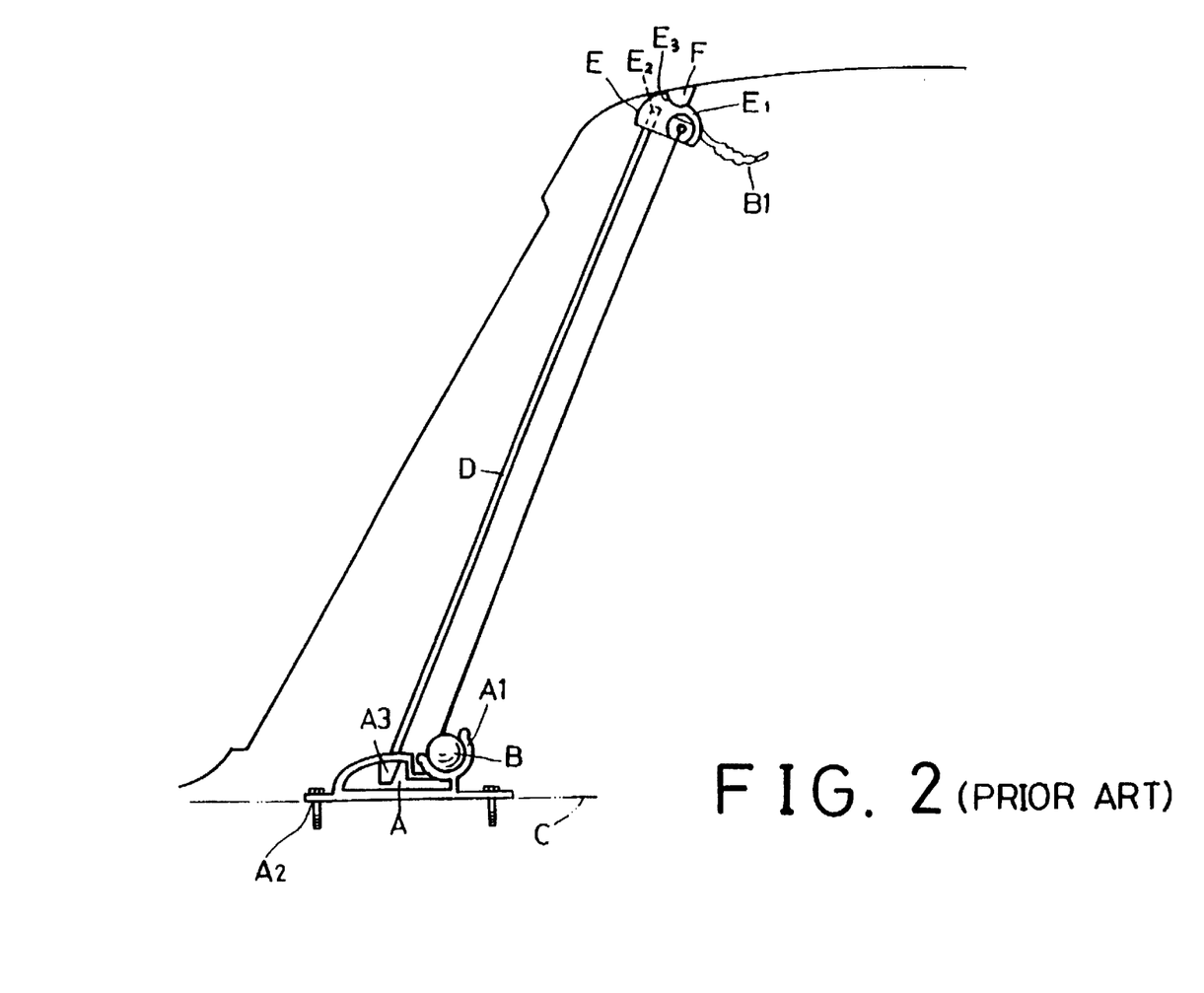
FIG. 2 is a side view of the known conventional automobile rear windshield sunshade device.

A conventional rear windshield sunshade device is shown in FIGS. 1 and 2, and includes a support base A, a sunshade curtain and roller B, a position block E, and a support bar D as main components.

The support base A has two threaded holes A2 for screws to fix the support base A on a soft flat surface under the rear windshield of a car, a curved wall A1 at a rear end, and a hole A3 in a center of the top surface.

The sunshade curtain and roller B is received in the curved wall A1, having a pull grip B1 in the center of an upper side of the sunshade curtain, with the pull grip B1 hung on a hook E1 of the support block E.

The position block E has a hook E1 for the pull grip B1, a hole E2 in a lower portion, and a downwardly curved wall E3 in the top to be fitted firmly with a rubber strip at a connect line between the rear windshield and the roof of a car.

The support bar D has an upper end fitted in the hole E2 of the position block E and a lower end fitted in the support base A.

The pull grip B1 is pulled to be hung on the hook E1 of the support block E, moving up the sunshade curtain from a winding roller B.

However, the known conventional sunshade device has drawbacks as follows.

1. It hardly adapts to different inclined angles of rear windshields as the sunshade curtain is moved and positioned in a definite preset direction.
2. Different cars have rear windshields of different sizes, so if the support rod has a definite length and the distance between the flat surface C and the roof F of a car is longer or shorter than the support rod D, the sunshade curtain may not cover the whole rear windshield.
3. It is operated manually, so if no one sits in the back seat and sunlight is reflected by a rearview mirror to shine on the driver's face, the driver must stop the car and then pull up the sunshade curtain.

SUMMARY OF THE INVENTION

The purpose of the invention is to offer a rear windshield sunshade device moved or stopped by a switch fixed in the gauge panel of a car, and a sunshade curtain which can be adjusted to correspond to variously inclined rear windshields.

The main feature of the present invention is a base to be fixed on a flat surface under the rear windshield of a car for supporting the components of this device. Further, a moving unit is combined pivotally with the base, having an elongate case for containing a motor and two gears engaging with each other. The two gears are fixed with two shafts supported in a front and a rear side of the case, each protruding out of the rear side to be fixed with an end of a lower portion of one of two driving arms. Each driving arm consists of the lower portion and an upper portion pivotally connected with the lower portion. Further, a sunshade unit is provided, including a sunshade curtain, a winding roller, and a connect strip fixed to an upper end of the sunshade curtain. The strip is then fixed to an elongate bar pivotally connected with an upper end of each driving Arm. The lower portions of the two driving arms are supported in an elongated groove formed with an elongated L-shaped wall fixed with a rear side of the case. The winding roller is supported in an elongated curved trough fixed with a rear surface of the elongated L-shaped wall.

The case can be adjusted in its angle relative to the base to adapt to the inclination of the rear windshield of a car by means of two position screws. When the motor is started by the switch on the gauge panel, the two gears are rotated to gradually move the two driving arms up from horizontal positions to vertical positions. At the same time the sunshade curtain is pulled up by the elongate bar, which is also raised by the driving arms. Contact switches fixed on an inner surface of the rear side of the case are contacted by contact discs fixed on back sides of the two gears to automatically turn off the motor, with the curtain kept in the raised-up position to shade the rear windshield. If the curtain is to be lowered, the switch on the gauge panel is pressed to cause the motor to rotate the two gears in a reverse direction to move the two driving arms down to the horizontal positions, with the curtain automatically being wound on the winding roller.

BRIEF DESCRIPTION OF DRAWINGS

This invention will be better understood by reference to the accompanying drawings, wherein.

DESCRIPTION OF THE PREFERRED EMBODIMENT

Figure 3:
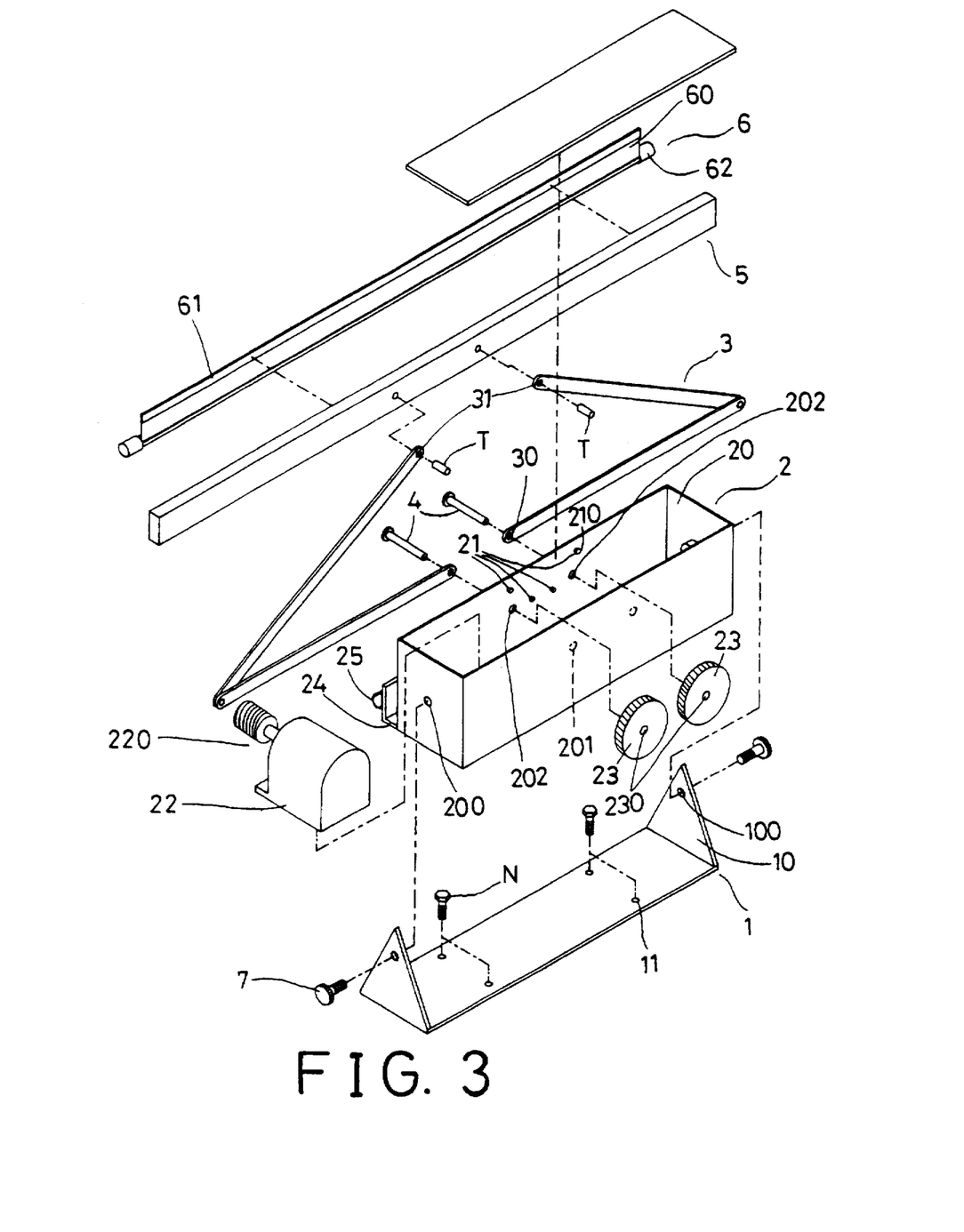
FIG. 3 is an exploded perspective view of an automobile rear windshield sunshade device of the present invention.

A preferred embodiment of a automobile rear windshield sunshade device in the present invention, as shown in FIG. 3, includes a base 1, a moving unit 2, two driving arms 3, 3, an elongate bar 5, and a sunshade unit 6 as main components.

The base 1 has a flat horizontal portion and two triangular vertical sides 10, 10 extending upward from two sides of the flat portion. The flat portion has a plurality of screw holes spaced apart, and each triangular side 10 has a threaded hole 100 near its pointed top.

The moving unit 2 is located on the base 1, combined with the two vertical triangular sides, having an elongated rectangular case 20, and a motor 22 placed in the case 20. The case 20 has a threaded hole 200 in each side to align with the threaded holes 100 of the base 1, two shaft holes 201, 201 in a front side, two shaft holes 202, 202 in a rear side aligning with the two shaft holes 201, 201, a plurality of contact switches 21 fixed on an inner surface of the rear side arranged 90 degrees to each other, each respectively having a top contact face 210.

The motor 22 has a transmitting wheel 220 fixed on its shaft, the transmitting wheel 220 engaging one of two gears 23, 23 fixed on two elongate shafts 4, 4 side by side in the case 2 and engaging with each other so that the two gears 23, 23 rotate in opposite directions when rotated by the transmitting wheel 220. The two gears 23, 23 each have a center shaft hole 230 aligned with the shaft holes 201 and 202. A contact disc 231 is fixed on a back side of each gear 23, located on so as to contact the contact switches 21.

Further, an L-shaped elongated wall 24 is additionally fixed with the rear side of the case 20 to form an elongated groove, and a trough 25 is fixed on an outer side of the L-shaped wall 24.

The two driving arms 3, 3 respectively each have two elongate portions connected together with a pivot and a shaft hole 30 respectively bored at an inner end of a lower portion for a shaft 4 to pass through and to be fixed firmly therewith. The front end of each shaft 4 is firmly fixed with a center hole of each gear 23. A hole 31 is bored at an upper end of each driving arm 3 for a rivet T to pass through so as to combine each driving rod 3 with the elongated bar 5 which is connected with a strip 61 of the sunshade unit 6.

The elongated bar 5 has a rectangular cross-section, and is combined with the upper end of each driving arm 3 by means of rivet T.

The sunshade unit 6 has a self-winding sun-shade curtain 60, a strip 61 connected with an upper end of the curtain 60 and then fixed firmly with a rear side of the elongated bar 5, a winding roller 62 fixed with a lower end of the curtain 60 for winding same thereon received in the trough 25 of the case 20.

The moving unit 2 is combined with the base I by means of two position screws 7, 7, making it possible to be adjustably secured vertically, or inclined at many different angles relative to the base 1.

Figure 4:
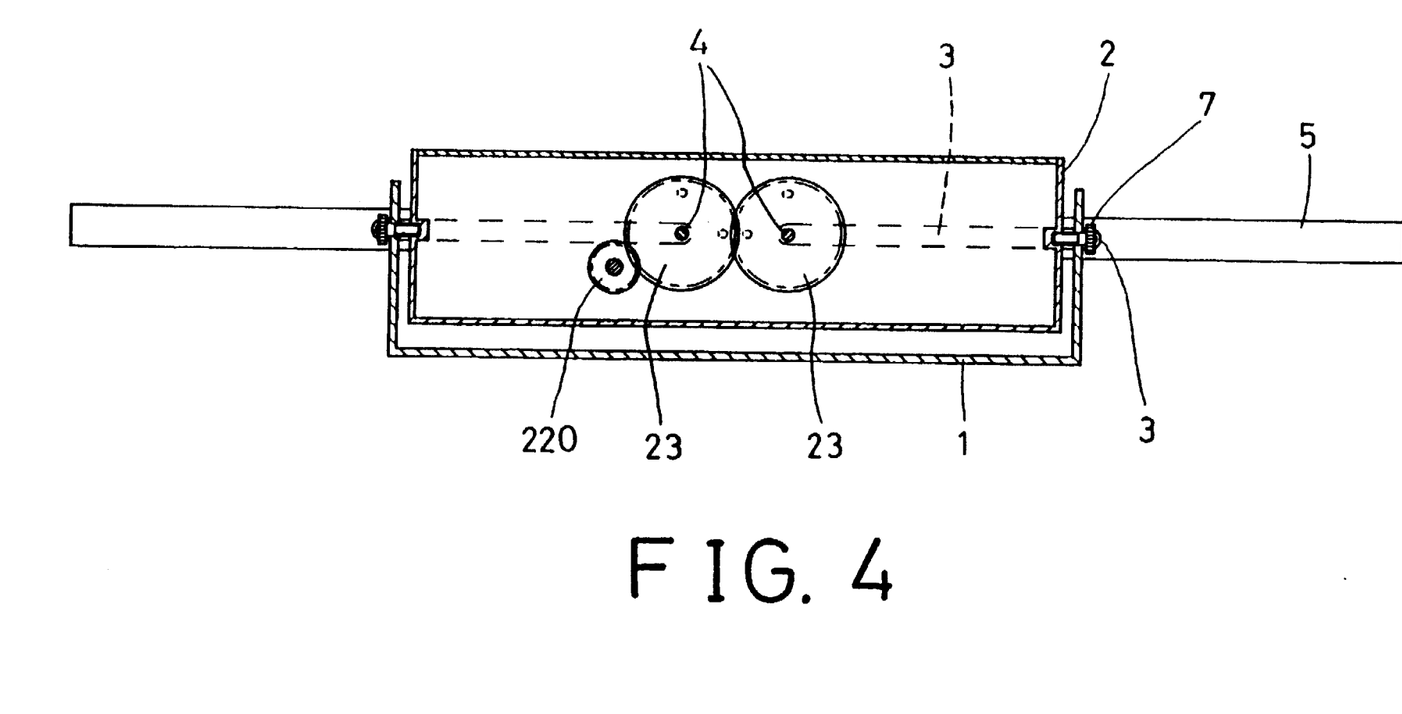
FIG. 4 is a cross-sectional view of the automobile rear windshield sunshade device in the present invention.

In assembling, referring to FIGS. 3 and 4, firstly the moving unit 2 is combined with the base 1, with the motor 22 and the two gears 23 deposited in the case 20, and with the two contact discs 231, 231 positioned on the line formed by the contact switches 21. Next, the driving arms 3, 3 are placed behind the case 20, with the shaft holes 30 aligned to the shaft holes 202 of the case 20 and the elongate shafts 4, 4 are put through the shaft holes 30 and 202, the shaft holes 230, 230 of the gears 23, 23 and in the shaft holes 201 of the front side of the case 20 so as to combine the driving arms 3, 3 and the gears 23, 23 with the case 20 stably, enabling the gears 23, 23 to rotate and the driving arms 3, 3 to fold in the elongated groove formed between the elongated wall 24 and the rear side of the case 20. Then the rivets T are put into the holes 31 in the upper ends of the driving arms 3, 3, combining the driving arms 3, 3 with the elongated bar 5. Then the sunshade unit 6 is combined with the elongated bar 5, with the strip 61 fixed with a rear side of the elongated bar 5 and with the winding roller 62 fitting stably in the trough 25 of the case 20. After that, the case 20 is combined with the base 1, with the threaded holes 200 aligned with the threaded holes 100 of the base 1, and with the position screws 7, engaging with those threaded holes 200 and 100.

Figure 8:
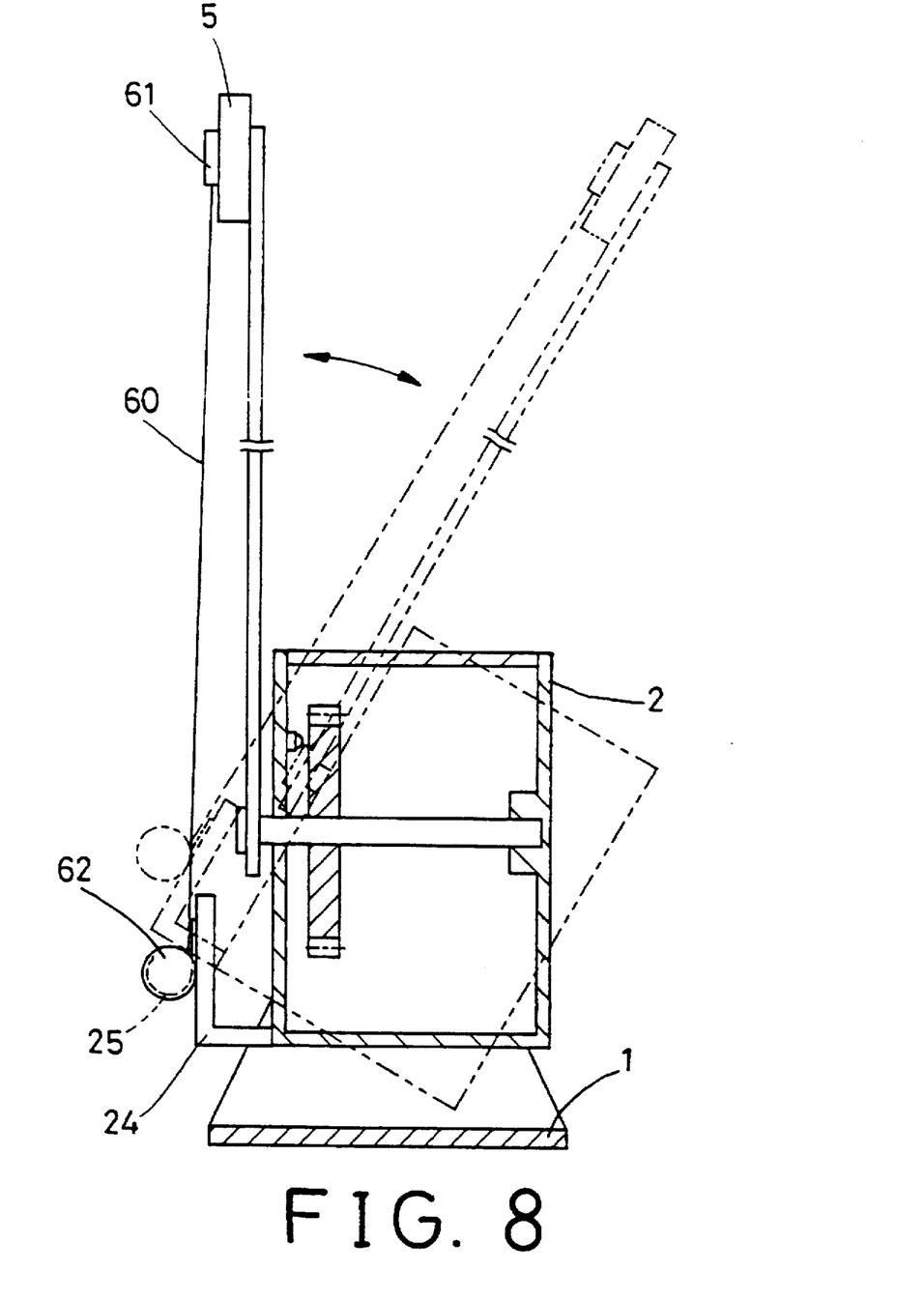
FIG. 8 is a side cross-sectional view of FIG. 6.

If the position screws 7, 7 are loosened, the moving unit 2 can freely be rotated as shown in FIG. 8, and angularly adjusted relative to the base 1, and if the screws 7, 7 are tightened the moving unit 2 is fastened securely and tightly. Lastly, the screws N are used to secure the base I tightly with the rear windshield of a car.

Figure 5:
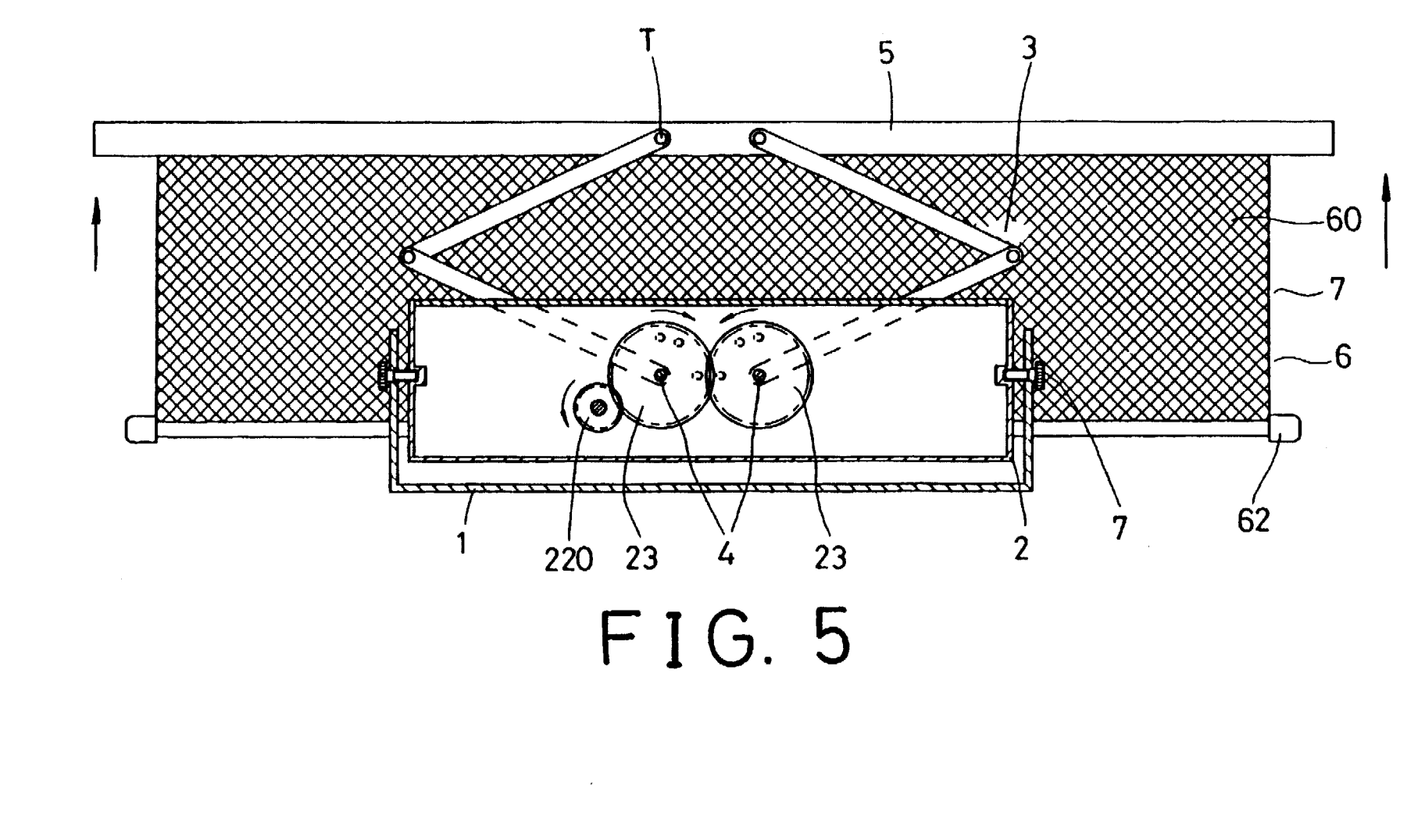
FIG. 5 is a front and a partial cross-sectional view of the automobile rear windshield sunshade device in the present invention, showing it partially extended.
Figure 6:
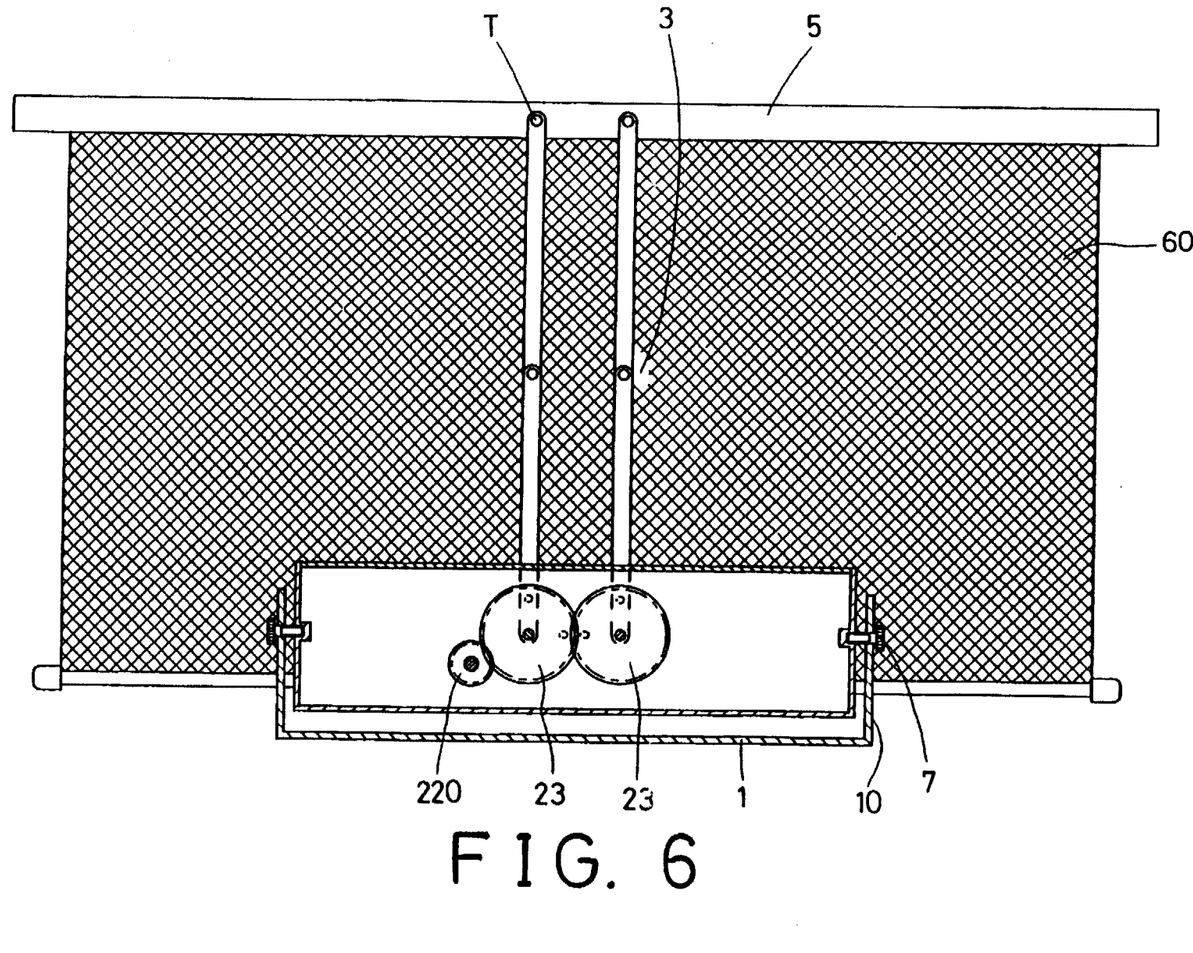
FIG. 6 is a front and a partial cross-sectional view of the automobile rear windshield sunshade device in the present invention, showing it being fully extended.
Figure 7:
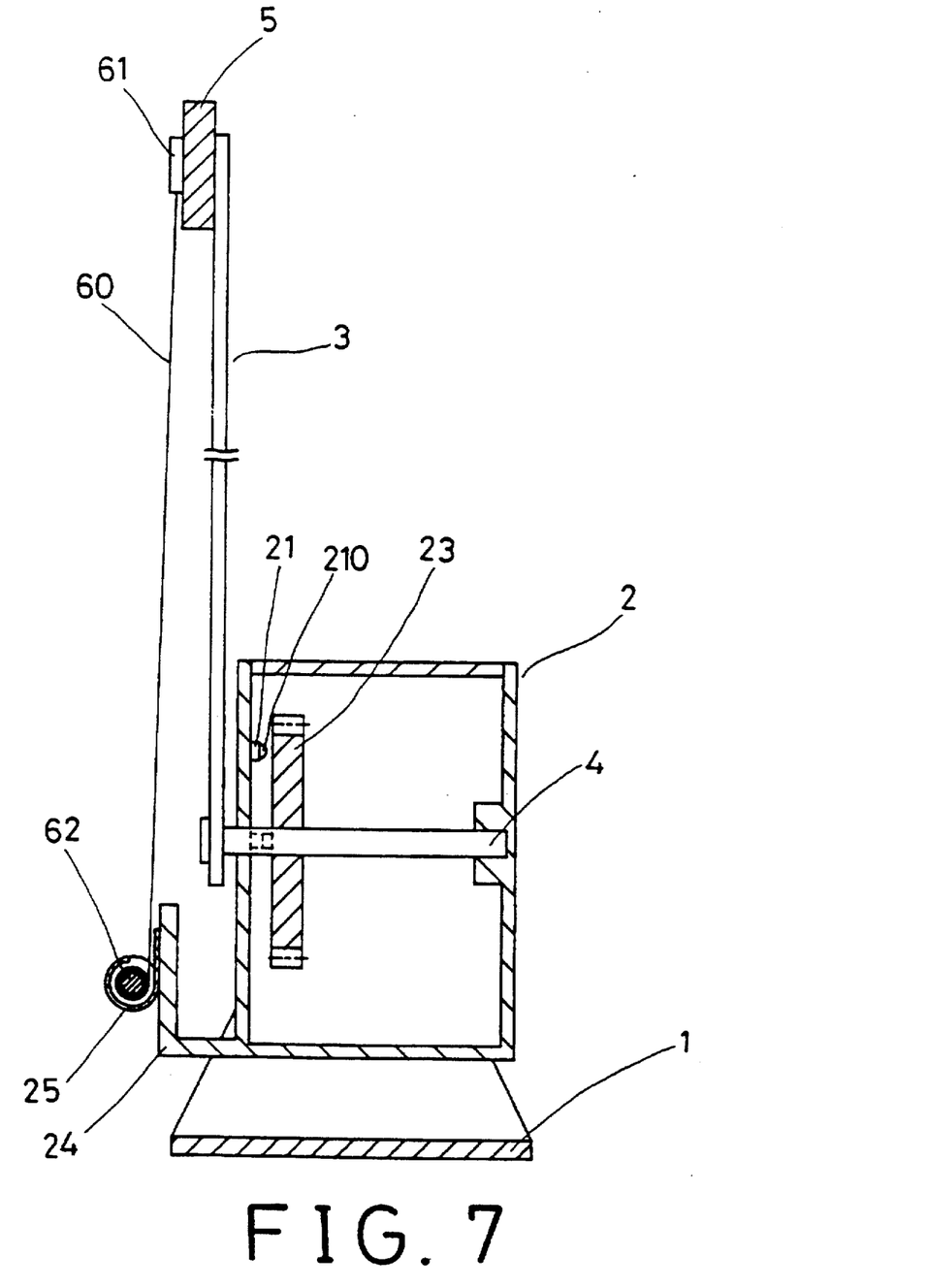
FIG. 7 is a side cross-sectional view of FIG. 5.
Figure 9A:
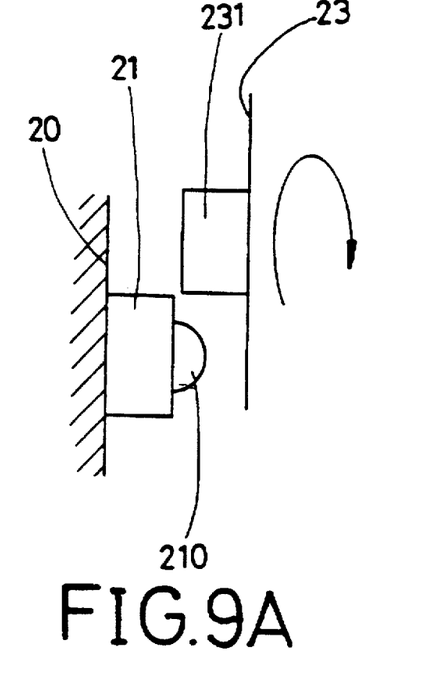
FIGS. 9A and 9B are side views of a contact disc being moved in the automobile rear windshield sunshade device in the present invention.
Figure 9B:
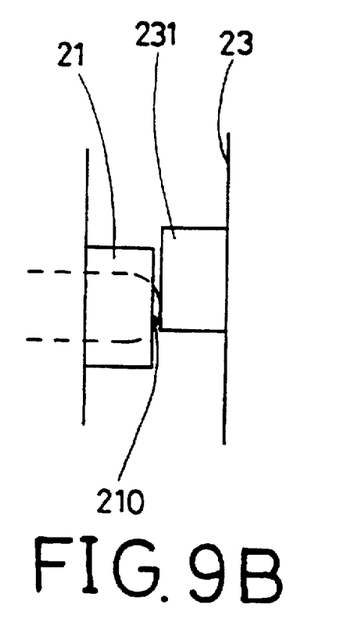

In use, referring to FIGS. 5, 6, 7 and 8, the moving unit 2 is adjusted to a needed position (as shown in FIG. 8) in the way described above, and then the motor 22 is started to rotate the transmitting wheel 220, which then rotates the two gears 23, 23 in opposite directions. The gears 23, 23 then move the two driving arms 3, 3 upward and finally to become vertical with the connect point as a fulcrum as shown in FIGS. 5 and 6. Meanwhile, the elongated bar 5 is raised, and consequently the strip 61 of the sunshade unit 6 is also raised up, with the sunshade curtain 60 being pulled up. When the curtain 60 reaches the highest point, the driving arms 3 become vertical to the moving unit 2, as shown in FIGS. 6 and 7. In other words, the gears 23, 23 have been rotated for one quarter of a turn or 90 degrees. In this position, the contact disc 231, 231 of the gears 23, 23 come to contact with the contact faces 210, 210 of the contact switches 21, 21 as shown in FIG. 9, forcing the contact faces 210, 210 to activate the contact switches 21, 21 so as to turn off the motor 22.

If the sunshade curtain 60 is to be rolled back on the winding roller 62 from a spread condition, the motor 22 is started by pressing the switch fixed on the gauge panel. Then the transmitting wheel 220 is rotated in reverse, and consequently the gears 23, 23 are also rotated in an opposite direction. So the sunshade curtain 62 is moved down gradually by automatic rotation of the winding roller 62, which winds the curtain 60 in the elongated trough 25. At the same time, the driving arms 3, 3 move down into the elongated groove of the elongate wall 24.

As can be understood from the above description, this invention is considered to have advantages as follows.

1. It can be adapted to many kinds of cars, as the moving unit can be adjusted in a plurality of slopes against the rear windshield of a car.

2. It can be adapted to different heights of the rear windshields of different cars, as the driving arms are lifted up gradually.

3. It is convenient to use, as its switch can be positioned on a gauge panel, and in addition, the contact switches provided in the moving unit secures its operation stably and exactly.

While the preferred embodiment has been described above, it will be recognized and understood that various modifications may be made therein and the appended claims are intended to cover all such modifications which may fall in the spirit and scope of the invention.

What is claimed is:

1. An automobile rear windshield sunshade device comprising:

a base fixed on a flat surface under the rear windshield of a car having a flat horizontal portion with first and second sides extending upwardly from opposite sides of said flat horizontal portion, said first and second sides each respectively having a threaded hole near a top;

a moving unit attached to the base and comprising:

an elongated rectangular case with an open upper side, having right and left sides each with a threaded hole aligned with said threaded holes of said base, a rear side with two first shaft holes, a front side with two second shaft holes respectively aligned with said two first shaft holes in said rear side, an elongated wall fixed along an outer surface of said rear side to form an elongated groove and an elongated trough;

a plurality of spaced apart contact switches fixed on an inner surface of said rear side of said case;

a motor located in said case, having a transmitting wheel on an output shaft;

two gears in engagement with each other rotatable mounted in said case, one of said gears engaged with so as to be rotated by said transmitting wheel, each gear having a contact disc fixed on a first side;

two driving arms each having upper and lower portions pivotally connected together each said lower portion having an inner end and each upper portion having an outer end;

two shafts each shaft fixed to an inner end of one of said driving arms and passing through said first and second shaft holes of said case and fixed firmly to one of said two gears such that rotation of the gears causes rotation of the shafts and the driving arms;

an elongated bar pivotally connected to said outer ends of said upper portions of said driving arms;

a sunshade unit having a sunshade curtain with an upper strip attached to said elongated bar, and a lower end resting in said elongated trough of said case; and position screws engaging said threaded holes of said base and said case, so as to adjustably fix said case in one of a plurality of angular positions relative to said base;

to adapt to an angle of a rear windshield of a car, whereby rotation of said motor rotates said two gears approximately 90 degrees to extend said driving arms, which pushes up said elongated bar to pull up said sunshade curtain of said sunshade unit to shade rear windshield.

2. The automobile rear windshield sunshade device as claimed in claim 1, wherein said base is U-shaped, having a flat horizontal portion and two triangular sides extending upwardly from opposite ends of said flat portion.

3. The automobile rear windshield sunshade device as claimed in claim 1, wherein said elongated wall is L-shaped to form an elongated groove for receiving said driving arms therein.

4. The automobile rear windshield sunshade device as claimed in claim 1, wherein said plurality of contact switches each have a top contact surface so as to contact said gears.

* * * * *